(12) United States Patent
Shimose

(10) Patent No.: US 6,842,193 B2
(45) Date of Patent: Jan. 11, 2005

(54) ELECTRONIC CAMERA

(75) Inventor: Norihiko Shimose, Ehime (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 845 days.

(21) Appl. No.: 09/820,635

(22) Filed: Mar. 30, 2001

(65) Prior Publication Data
US 2001/0036363 A1 Nov. 1, 2001

(51) Int. Cl.⁷ .............................................. H04N 5/225
(52) U.S. Cl. ...................................... 348/373; 348/376
(58) Field of Search ................................. 348/373, 374, 348/375, 376, 207.99; 358/906, 909.1; 396/535, 207

(56) References Cited
U.S. PATENT DOCUMENTS

| 4,136,361 | A | * | 1/1979 | Doan ........................... 348/376 |
| 4,639,772 | A | * | 1/1987 | Sluyter et al. ............... 348/373 |
| 5,854,952 | A | * | 12/1998 | Terada ......................... 396/413 |
| 5,960,156 | A | * | 9/1999 | Nishiyama et al. ......... 348/374 |
| 6,573,939 | B1 | * | 6/2003 | Yokoyama .................... 348/375 |
| 6,781,634 | B1 | * | 8/2004 | Shiozaki et al. ............ 348/374 |
| 2002/0163588 | A1 | * | 11/2002 | Holmberg .................... 348/373 |

* cited by examiner

*Primary Examiner*—Aung Moe
(74) *Attorney, Agent, or Firm*—Wenderoth, Lind & Ponack, L..L.P.

(57) ABSTRACT

An objective lens 3 for taking a photograph of a subject is arranged on one end surface of a generally cylindrical electronic camera body 1. A display device 2 for displaying the taken image is arranged on another end surface. Zoom switches 5 and 6 for operating the electronic camera, and a shutter 7 are arranged in a position out of the center in a longitudinal direction of the side. Further, when carrying the camera, a strap 9 can be fixed to a strap fixing parts 8, and the camera can be carried by suspending from the neck. Therefore, there is provided an electronic camera which, even when the camera is miniaturized so as to be suitable for carrying, does not cause erroneous operations and is convenient to use.

21 Claims, 7 Drawing Sheets

ELECTRONIC CAMERA

FIELD OF THE INVENTION

The present invention relates to an electronic camera, and more particularly, to the shape of the body of the electronic camera, and the arrangement of components which constitute its body.

BACKGROUND OF THE INVENTION

Hereinafter, a conventional electronic camera will be described with reference to FIG. 7. FIG. 7(a) shows a front perspective view of a conventional electronic camera. FIG. 7(b) shows a rear perspective view of the conventional electronic camera.

The conventional electronic camera 70 shown in FIG. 7 includes an objective lens 73, a finder 74, a shutter 75, an operation switch 76, and the like. In the electronic camera 70, when a photographer takes a photograph of a subject, initially, the photographer directs the objective lens 73 for taking a photograph of the subject to the subject to be photographed. While confirming a subject image which is displayed on the finder 74 or a display device 72, he/she adjusts the size of the subject image by operating a zoom switch or the like. Thereafter, he/she presses the shutter 75, thereby taking a photograph. Further, after taking a photograph is finished, for example, when he/she wants to confirm the taken image, he/she can do so by operating the operation switch 76 to switch a mode and change the contents displayed on the display device 72, so that the taken image is displayed on the display device 72.

In recent years, the conventional electronic camera described above is attempted to be miniaturized in order to improve the portability thereof. Then, the size and the operation of the electronic camera when the electronic camera is miniaturized, greatly depend upon at which positions the display device 72, the objective lens 73, the operation switch 76 and the like constituting the conventional electronic camera 70 are arranged.

However, there is a limitation to miniaturizing the conventional electronic camera 70 with keeping having all the components as well as keeping its shape. In addition, when respective components of the conventional electronic camera 70 are miniaturized with keeping their arrangement, the respective switches such as the shutter 75 and the operation switch 76 come closer to each other, and thereby resulting in a problem that unnecessary operations of the respective switches by the operator will cause erroneous picturing.

SUMMARY OF THE INVENTION

The present invention is directed to solving the above-described problems, and has for its object to provide an electronic camera which is miniaturized to be superior in portability as well as which should not cause erroneous operations.

In order to solve the problems, according to a first aspect of the present invention, in an electronic camera which has a photographing function of taking a photograph of a subject and a display device for displaying an image photographed by the photographing function, an objective lens for taking a photograph of the subject is arranged on one end surface of the generally cylindrical electronic camera body, the display device is arranged on another end surface of the electronic camera body, and operation means for driving the electronic camera is arranged in a position out of the center in a longitudinal direction of the side of the electronic camera body. Therefore, there can be provided a miniaturized electronic camera where the ease of operation is improved, and which is convenient to use.

According to a second aspect of the present invention, in the electronic camera as defined in the first aspect, the shape of one end surface of the electronic camera body which provides the display device is a curved surface. Therefore, when the photographer puts his/her eye on the display device at the time of photographing, the end surface fits his/her face, so that there can be provided the electronic-camera the display device of which is easily looked at, and which is comfortable to use.

According to a third aspect of the present invention, in the electronic camera as defined in the first aspect, fixing means of a strap for suspending from the neck is arranged on the side out of the center of the generally cylindrical electronic camera body, and, in the case where the strap for suspending from the neck is fixed to the fixing means and the electronic camera body is carried in a state of suspending from the neck, a longitudinal direction of the electronic camera body is vertical to the ground. Therefore, there can be provided the electronic camera which is superior in portability.

According to a fourth aspect of the present invention, in the electronic camera as defined in the first aspect, the fixing means of the strap for suspending from the neck is arranged on the side of the generally cylindrical electronic camera body, and, in the case where the strap for suspending from the neck is fixed to the fixing means and the electronic camera body is carried in a state of suspending from the neck, a longitudinal direction of the electronic camera body is vertical to the ground. Therefore, there can be provided the electronic camera which is superior in portability.

According to a fifth aspect of the present invention, in the electronic camera as defined in the third or fourth aspect, in the case of using the strap for suspending from the neck to carry the electronic camera body in a state of suspending from the neck, the fixing means is arranged such that one end surface of the electronic camera body which provides the display device faces upward. Therefore, there can be provided the electronic camera by which, when the photographer wants to restart photographing, he/she can start photographing as soon as he/she holds the electronic camera body in one hand, and where the ease of operation is improved.

According to a sixth aspect of the present invention, in the electronic camera as defined in the first aspect, a section of the generally cylindrical electronic camera body has an elliptic shape. Therefore, components are easily arranged on the electronic camera body, and further the photographer easily holds the electronic camera body at the time of photographing.

According to a seventh aspect of the present invention, in the electronic camera as defined in the first aspect, a section of the generally cylindrical electronic camera body has the shape of the nearly rectangular parallelepiped. Therefore, components are easily arranged on the electronic camera body, and further the photographer easily holds the electronic camera body at the time of photographing.

According to an eighth aspect of the present invention, in an electronic camera which has a photographing function for taking a photograph of a subject and a display device for displaying an image photographed by the photographing function, an objective lens for taking a photograph of the subject and an infrared sensor are arranged on one end surface of the generally cylindrical electronic camera body, the display device is arranged on another end surface of the electronic camera body, operation means for driving the electronic camera is arranged in a position out of the center in a longitudinal direction of the side of the electronic camera body, and a focus adjusting device which makes a focus distance of the objective lens variable by the infrared sensor is provided in the electronic camera body. Therefore, there can be provided the miniaturized camera which can perform autofocus control, where the ease of operation is improved, and which is convenient to use.

According to a ninth aspect of the present invention, in an electronic camera, a display device for confirming the subject image to be photographed by the photographer looking at the image, and an objective lens for catching the subject image to be photographed are arranged on the opposed bottom parts of the cylindrical body, respectively, the photographer holds the side of the middle between the display device and the objective lens by hand so that the cylindrical body longitudinally extends in front of the photographer's eye, at the time of photographing, and operation means for driving the display device and the objective lens is arranged in a position where it can be operated by the photographer's fingertips of the hand for holding the cylindrical body. Therefore, there can be provided the electronic camera where the ease of operation is improved, and which is convenient to use.

According to a tenth aspect of the present invention, in the electronic camera as defined in the ninth aspect, the objective lens and the display device are arranged approximately in line. Therefore, a difference between positions of the display device and the objective lens can be removed, and there can be provided the electronic camera by which the photographer more easily catches the subject at the time of photographing.

According to an eleventh aspect of the present invention, in the electronic camera as defined in the ninth aspect, the operation means is arranged in a position out of a position of the photographer's fingertips of the hand for holding the side of the body at the time of photographing. Therefore, the photographer's fingers of the hand for holding the electronic camera body do not touch the operation means at the time of photographing, thereby preventing erroneous operations of the operation means by the photographer.

According to a twelfth aspect of the present invention, in the electronic camera as defined in the eleventh aspect, the operation means is arranged in a position of putting out at least one finger among the photographer's first, second and third fingers for holding the body at the time of photographing. Therefore, the photographer's fingers of the hand for holding the electronic camera do not touch the operation means at the time of photographing, thereby preventing erroneous operations of the operation means by the photographer. Further, when the operation of the operation means is required, the operation means can be operated by putting out the photographer's fingers of the hand for holding the electronic camera, whereby there can be provided the electronic camera where the ease of operation is improved, and which is convenient to use.

According to a thirteenth aspect of the present invention, in the electronic camera as defined in any of the ninth through twelfth aspects, the shape of the whole bottom of the body which provides the display device has a curved surface along the shape of the photographer's face, at the time when the bottom is held to the photographer's eye. Therefore, when the photographer puts his/her eye on the display device at the time of photographing, the end surface fits his/her face, so that there can be provided the electronic camera the display device of which is easily looked at, and which is comfortable to use.

According to a fourteenth aspect of the present invention, in the electronic camera as defined in any of the ninth through twelfth aspects, at the time except the time of photographing, the electronic camera is suspended from the photographer's neck such that the display device and the objective lens face upward and downward, respectively. Therefore, there can be provided the electronic camera which is superior in portability, by which, when the photographer wants to restart photographing, he/she can start photographing as soon as he/she holds the electronic camera body in one hand, and where the ease of operation is improved.

DETAILED DESCRIPTION OF THE PREFERRED EMBODIMENTS

[Embodiment 1]

Figure 1:
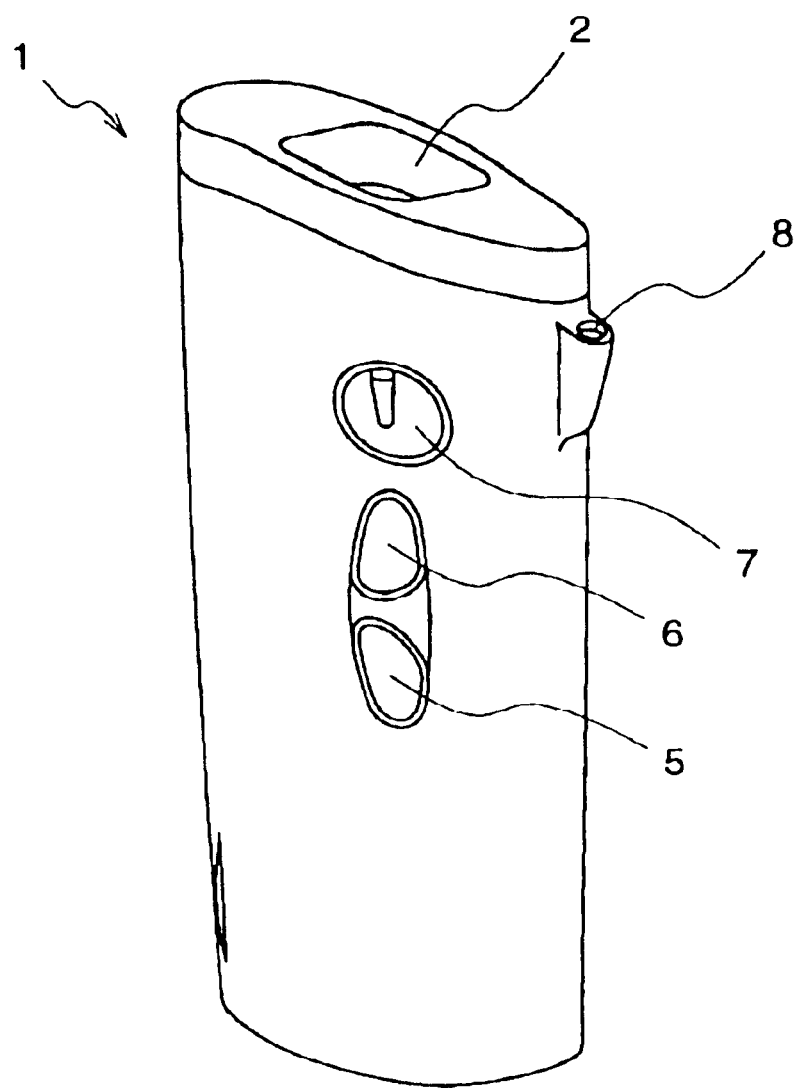
FIG. 1 is a perspective view showing an appearance of the electronic camera body according to a first embodiment of the present invention.
Figure 2:
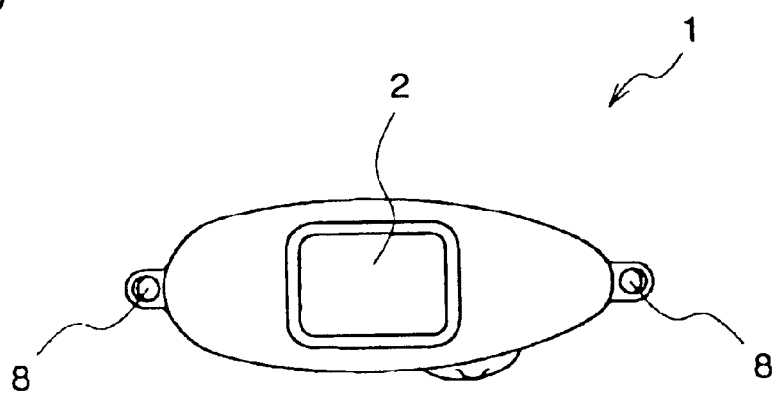
FIGS. 2 are a plan view and a bottom view showing the appearance of the electronic camera body according to the first embodiment of the present invention.
Figure 2:
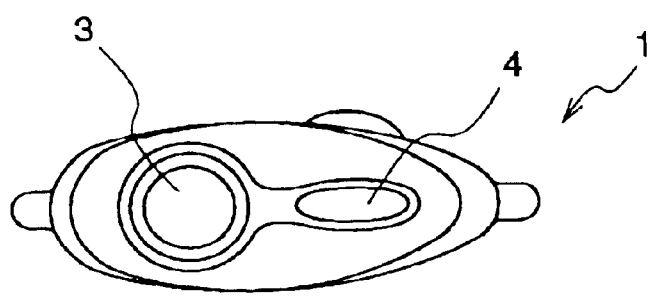

Hereinafter, an electronic camera according to a first embodiment of the present invention will be described with reference to FIGS. 1 to 6. FIG. 1 shows a perspective view of an electronic camera body according to this embodiment. FIG. 2(a) shows a plan view of the electronic camera body according to the first embodiment, and FIG. 2(b) shows a bottom view thereof.

In FIGS. 1 and 2, a display device 2 for displaying an image to be photographed or a taken image is arranged on one end surface of the electronic camera body 1 a section of which is elliptic, and which has a generally cylindrical shape, so as to be capable of confirming these images. An objective lens 3 for taking a photograph of a subject and an infrared sensor 4 for adjusting the focus to the subject are arranged on another end surface of the electronic camera body 1.

Then, on the side of the generally cylindrical electronic camera body 1, operation means, such as zoom switches 5 and 6 for increasing or decreasing the magnification of the subject image and a shutter 7 for operating when the photographer finally takes a photograph of the subject image, is arranged in a position which is slightly shifted from the center of the longitudinal direction to the end surface side where the display device 2 is arranged, and in a position that, when a photographer holds the electronic camera body 1, his/her fingers of the hand for holding the camera do not touch. Furthermore, on the side which is close to the display device 2 side of the electronic camera body 1, two strap fixing parts 8 are formed so that the photographer conveniently carries the electronic camera body 1.

Figure 6:
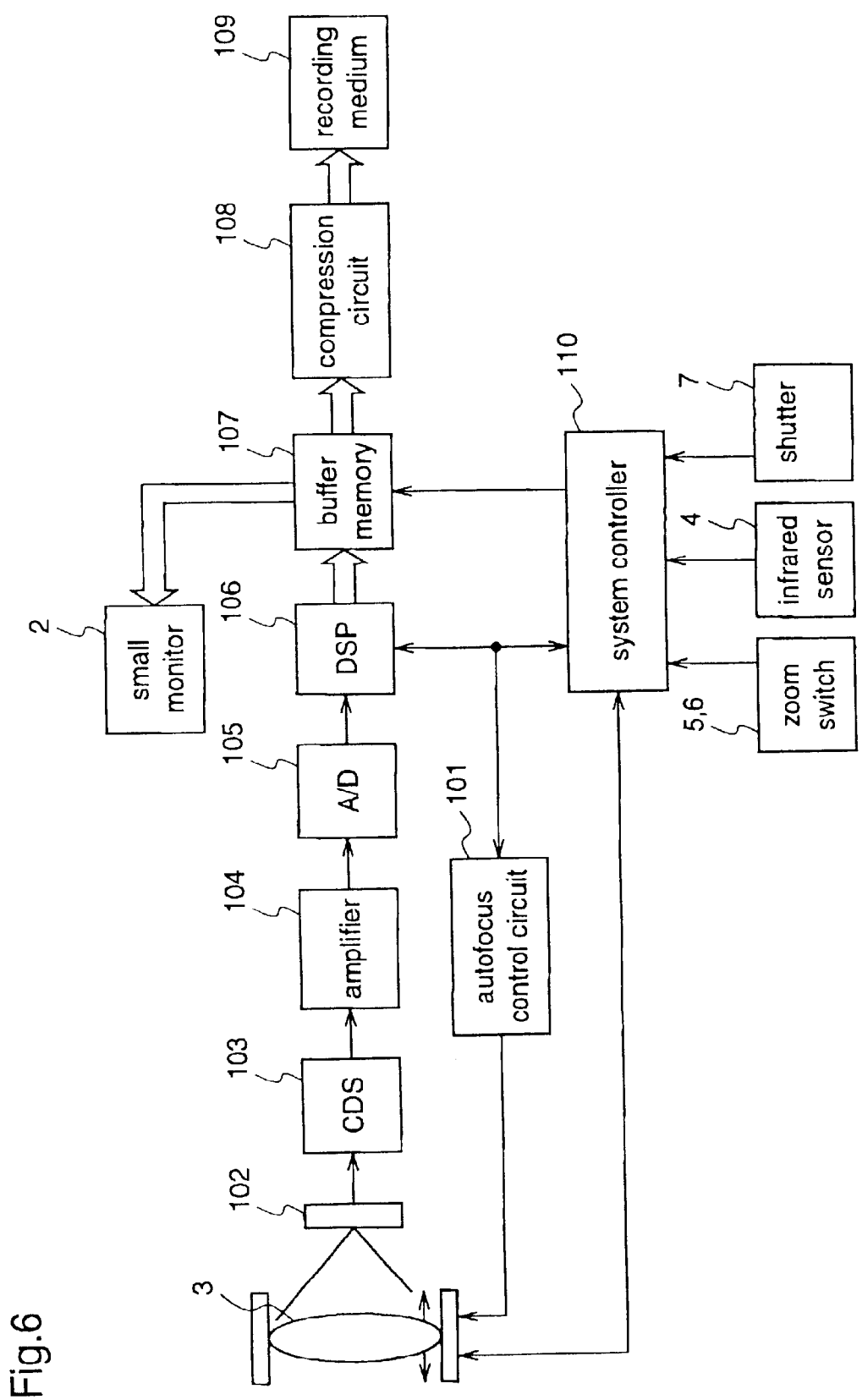
FIG. 6 is a block diagram illustrating a circuit structure of the electronic camera according to the first embodiment of the present invention.
Figure 7:
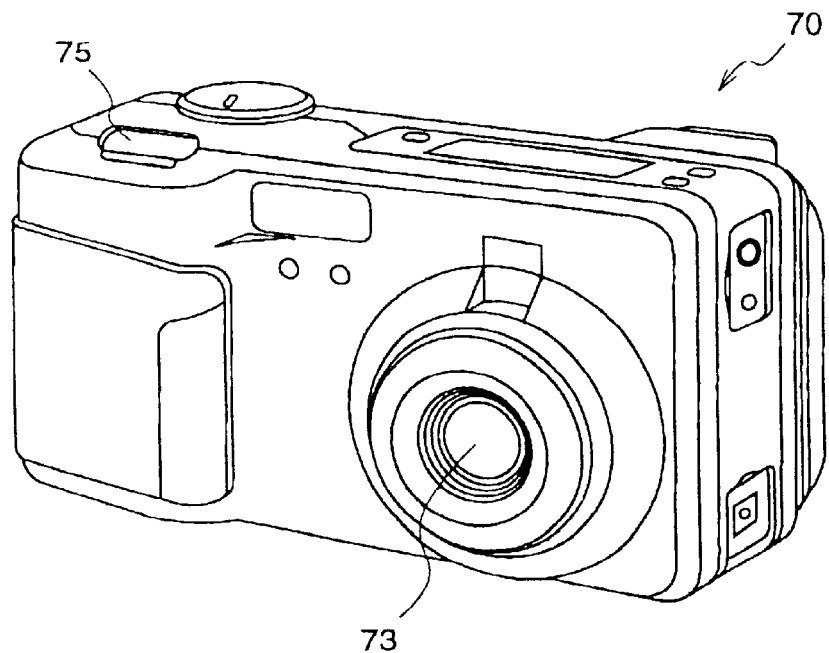
FIGS. 7 are perspective views showing an appearance of a conventional electronic camera.
Figure 7:
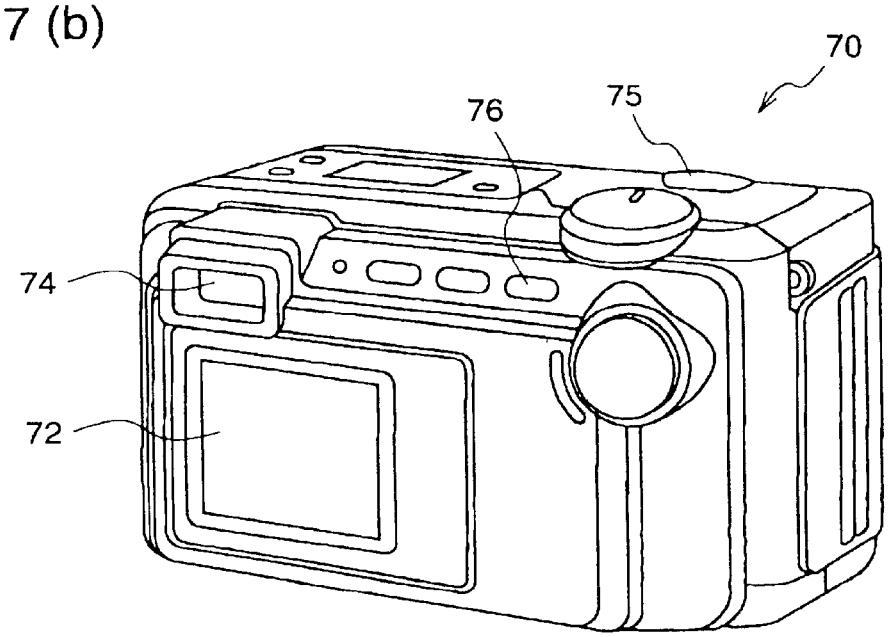

Next, a circuit structure for driving the electronic camera according to the first embodiment will be described with reference to FIG. 6. FIG. 6 shows an example of the circuit which drives the electronic camera according to the first embodiment.

In FIG. 6, the objective lens 3 is driven by the operation of the zoom switches 5 and 6, or driven by an autofocus control circuit 101 based on the infrared sensor 4. Then, an optical image of the subject which passes the objective lens 3 is focused into an image pickup element 102 such as a CCD. An image signal supplied from the image pickup element 102 is converted into digital image data by an A/D converter 105 after being processed in a correlated double sampling circuit (CDS) 103 and an amplifier 104. Further, the image signal is converted into data corresponding to a luminance and a color difference signal by a digital signal processing circuit (DSP) 106. This data is once written in a buffer memory 107. The data written in the buffer memory 107 is displayed on the display device 2, and is written in a recording medium 109, after being compressed in a compression circuit 108 by the operation of the shutter 7.

Figure 3:
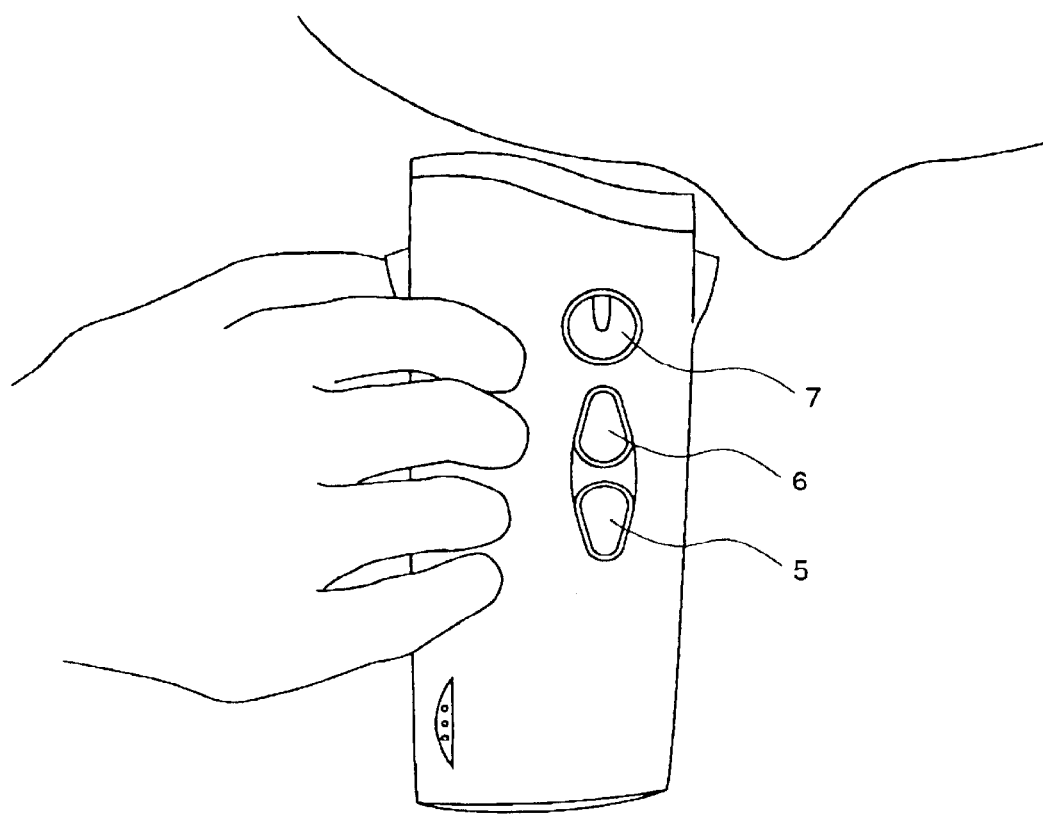
FIG. 3 is a front view showing the state of the electronic camera at the time of photographing according to the first embodiment of the present invention.
Figure 4:
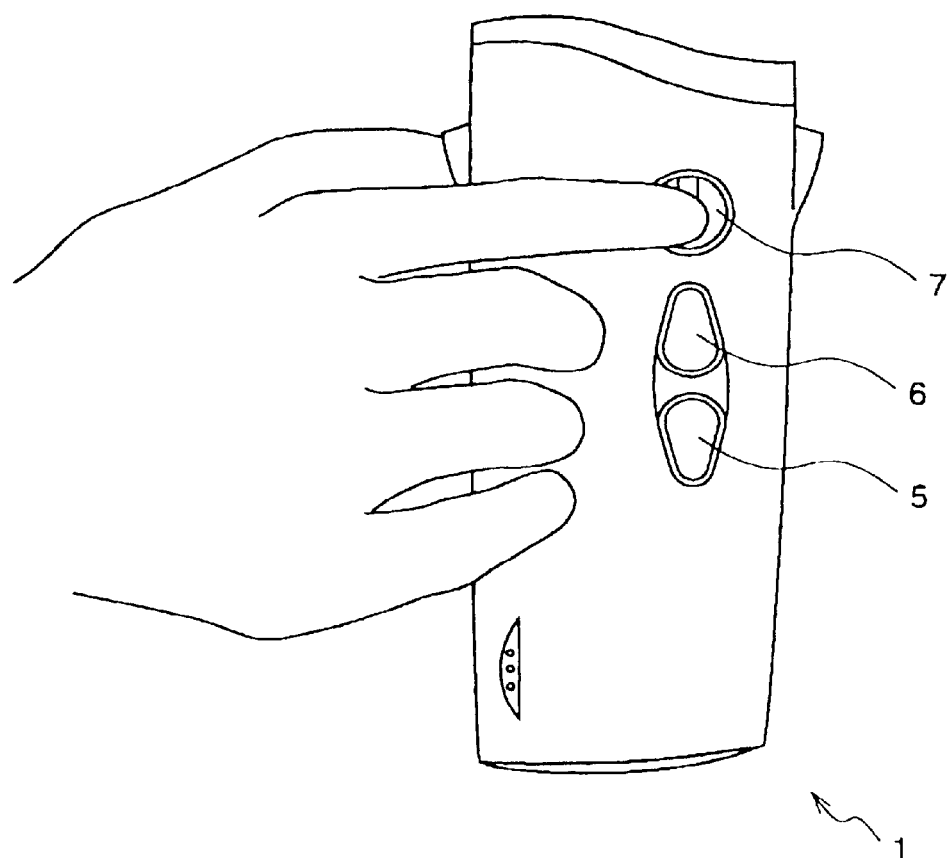
FIG. 4 is a front view showing the state of the electronic camera at the time of photographing according to the first embodiment of the present invention.

Here, the photographer's motion of taking a photograph of the subject by using the electronic camera according to the first embodiment will be described with reference to FIGS. 3 and 4. FIG. 3 is a view showing the state of the photographer who takes a photograph of the subject by the electronic camera according to the first embodiment. FIG. 4 is a view in which the photographer is operating the shutter of the electronic camera according to the first embodiment.

When he/she takes a photograph of the subject by using the electronic camera body 1 according to the first embodiment, initially, he/she holds a side part of the electronic camera body 1 in one hand as shown in FIG. 3, brings the display device close to his/her eye, and holds the electronic camera body 1 at the ready so as to catch the subject image by the objective lens 3.

As described above, the electronic camera body 1 has a generally cylindrical shape and is constructed such that its longitudinal direction extends in front of the photographer's eye. Further, each of the display device 2 and the objective lens 3 is arranged approximately in line on each end surface of the electronic camera body 1 so as to correspond with a direction of his/her eye, as shown in FIGS. 2(a) and (b). Thereby, when he/she confirms an image caught by the objective lens 3 on the display device 2 to take a photograph, there is no conventional difference between positions of the display device 2 and the objective lens 3. Therefore, he/she easily catches the subject at the time of photographing.

Then, he/she catches the subject image by the objective lens 3 of the electronic camera body 1 as described above, and then puts out his/her fingers required to operate each switch of the operation means among his/her fingers which hold the electronic camera body 1. Thereby, the operation of the respective switches is performed, and taking a photograph of the subject image is executed.

That is, the photographer adjusts the subject image which is monitored on the display device 2 so as to have a desired size, by putting his/her second or third finger out to operate the zoom switches 5 and 6. Thereafter, the photographer puts his/her first finger out to operate the shutter 7 as shown in FIG. 4, and takes a photograph.

Figure 5:
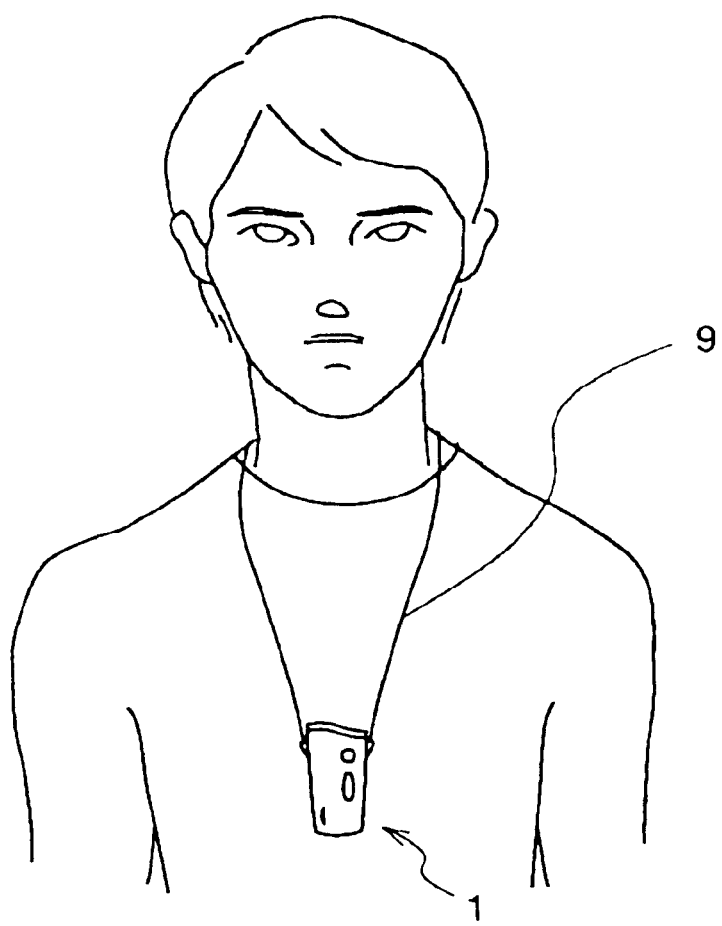
FIG. 5 is a view showing the state of the electronic camera at the time of carrying the same according to the first embodiment of the present invention.

Furthermore, the electronic camera body 1 according to the first embodiment is easy to carry by fixing the strap 9 to the strap fixing parts 8 of the electronic camera body 1 and suspending the body from the photographer's neck as shown in FIG. 5.

The strap fixing parts 8 are arranged in a position close to the display device 2 on the side of the electronic camera body 1 as shown in FIG. 1. When the photographer suspends the electronic camera body 1 from his/her neck by the strap 9 as shown in FIG. 5, the end surface of the display device 2 side of the electronic camera faces upward, and the end surface of the objective lens 3 side faces to the ground. In this way, while the photographer is carrying the electronic camera body 1, as long as the display device 2 and the objective lens 3 of the electronic camera always faces upward and to the ground, respectively, the photographer wants to restart photographing and holds the electronic camera body 1, whereby the display device 2 is in front of his/her eye. Thereby, the ease of operation is improved.

Further, in this first embodiment, the strap fixing parts 8 are arranged on the side close to the display device 2 of the electronic camera body 1. However, the arrangement position of the strap fixing parts 8 may be anywhere as long as it is in a position shifted from the center of the side of the electronic camera body 1 to the display device 2 side and, when the photographer uses the strap 9 to suspend the electronic camera body 1 from his/her neck, in a position that the longitudinal direction of the electronic camera body 1 is vertical to the ground.

As described above, in the electronic camera according to this first embodiment, when the photographer holds the electronic camera body 1, the respective switches, such as zoom switches 5 and 6 and the shutter 7, are arranged so that they are out of a position of his/her fingers of his/her hand for holding the camera. Therefore, at the time of photographing, when the respective switches of the electronic camera body 1 are not required to be operated, there is little chance that the photographer's fingers of his/her hand for holding the electronic camera body 1 accidentally touch the respective switches, thereby preventing erroneous actions of the electronic camera which are caused when the photographer erroneously operates the respective switches. Further, since the positions of the respective switches are arranged in positions shifted from the central part, the photographer can hold the central part of the side of the electronic camera body 1 with stability.

Furthermore, in the electronic camera according to this first embodiment, the shape of one end surface which provides the display device 2 is a curved surface along the shape of the face so as to fit the photographer's face at the time when he/she puts his/her eye on the end surface. Therefore, it is easy for the photographer to look at the display device 2, and the photographer can comfortably use the camera.

Further, when carrying the camera, the photographer can suspend the camera from his/her neck such that the longitudinal direction of the electronic camera body 1 is vertical to the ground in the state where the display device 2 faces upward. Therefore, when the photographer wants to restart photographing, as long as the photographer holds the electronic camera body 1 in one hand, the display device 2 is positioned in front of his/her eye. Therefore, photographing can be restarted immediately, and the ease of operation is improved. Further, when the photographer carries the electronic camera body 1 in the state where the power is kept on, in order to prevent consumption of the battery, the electronic camera may perform control in the electronic camera body 1 such that, in the case where the photographer's eye is in the vicinity of the display device 2 as shown in FIG. 3, the electronic camera perceives the same by a sensor (not shown) to display the image on the display device 2, and in the other cases, the image disappears.

Further, in the above description, the case where the shape of the electronic camera body 1 is generally cylindrical, and the section thereof is generally elliptic is raised as an example. However, the section may have the shape of a nearly rectangular parallelepiped.

What is claimed is:

1. An electronic camera which has a photographing function of taking a photograph of a subject and a display device for displaying an image photographed by the photographing function, wherein
   an objective lens for taking a photograph of the subject is arranged on one end surface of a generally cylindrical electronic camera body,
   the display device is arranged on another end surface of the generally cylindrical electronic camera body, and
   operation means for driving the electronic camera is arranged in a position out of the center in a longitudinal direction of a side of the generally cylindrical electronic camera body.

2. The electronic camera as defined in claim 1 wherein the shape of one end surface of the generally cylindrical electronic camera body which provides the display device is a curved surface.

3. The electronic camera as defined in claim 1, wherein a fixing means of a strap for suspending from a neck is arranged on the side out of the center of the generally cylindrical electronic camera body, and,
   in the case where the strap for suspending from the neck is fixed to the fixing means and the electronic camera body is carried in a state of suspending from the neck, a longitudinal direction of the electronic camera body is vertical to the ground.

4. The electronic camera as defined in claim 3, wherein in case of using the strap for suspending from the neck to carry the electronic camera body in a state of suspending from the neck, the fixing means is arranged such that one end surface of generally cylindrical electronic camera body which provides the display device faces upward.

5. The electronic camera as defined in claim 1, wherein a fixing means of a strap for suspending from a neck is arranged on the side of the generally cylindrical electronic camera body, and,
   in the case where the strap for suspending from the neck is fixed to the fixing means and the electronic camera body is carried in a state of suspending from the neck, a longitudinal direction of the electronic camera body is vertical to the ground.

6. The electronic camera as defined in claim 5, wherein in case of using the strap for suspending from the neck to carry the generally cylindrical electronic camera body in a state of suspending from the neck, the fixing means is arranged such that one end surface of the generally cylindrical electronic camera body which provides the display device faces upward.

7. The electronic camera as defined in claim 1, wherein a section of the generally cylindrical electronic camera body has an elliptic shape.

8. The electronic camera as defined in claim 1, wherein a section of the generally cylindrical electronic camera body has the shape of the nearly rectangular parallelepiped.

9. An electronic camera which has a photographing function of taking a photograph of a subject and a display device for displaying an image photographed by the photographing function, wherein
   an objective lens for taking a photograph of the subject and an infrared sensor are arranged on one end surface of a generally cylindrical electronic camera body,
   the display device is arranged on another end surface of the generally cylindrical electronic camera body,
   an operation means for driving the electronic camera is arranged in a position out of the center in a longitudinal direction of a side of the generally cylindrical electronic camera body, and
   a focus adjusting device which makes a focus distance of the objective lens variable by the infrared sensor is provided in the generally cylindrical electronic camera body.

10. An electronic camera, wherein
    a display device for confirming a subject image to be photographed by a photographer looking at the image, and an objective lens for catching the subject image to be photographed are arranged on the opposed bottom parts of a cylindrical body, respectively,
    the photographer holds a side of the middle between the display device and the objective lens by hand so that the cylindrical body longitudinally extends in front of the photographer's eye, at the time of photographing, and
    an operation means for driving the display device and the objective lens is arranged in a position where it can be operated by the photographer's fingertips of the hand for holding the cylindrical body.

11. The electronic camera as defined in claim 10, wherein the objective lens and the display device are arranged approximately in line.

12. The electronic camera is defined in claim 11, wherein the shape of the whole bottom of the body which provides the display device has a curved surface along the shape of the photographer's face, at the time when the bottom is held to the photographer's eye.

13. The electronic camera as defined in claim 11, wherein at the time except the time of photographing, the electronic camera is suspended from the photographer's neck such that the display device and the objective lens face upward and downward, respectively.

14. The electronic camera as defined in claim 10, wherein the operation means is arranged in a position out of a position of the photographer's fingertips of the hand for holding the side of the body at the time of photographing.

15. The electronic camera as defined in claim 14, wherein the operation means is arranged in a position of putting out at least one finger among the photographer's first, second and third fingers for holding the body at the time of photographing.

16. The electronic camera is defined in claim 15, wherein the shape of the whole bottom of the body which provides the display device has a curved surface along the shape of the photographer's face, at the time when the bottom is held to the photographer's eye.

17. The electronic camera as defined in claim 15, wherein at the time except the time of photographing, the electronic camera is suspended from the photographer's neck such that the display device and the objective lens face upward and downward, respectively.

18. The electronic camera is defined in claim 14, wherein the shape of the whole bottom of the body which provides the display device has a curved surface along the shape of the photographer's face, at the time when the bottom is held to the photographer's eye.

19. The electronic camera as defined in claim 14, wherein at the time except the time of photographing, the electronic camera is suspended from the photographer's neck such that the display device and the objective lens face upward and downward, respectively.

20. The electronic camera is defined in claim 10, wherein the shape of the whole bottom of the body which provides the display device has a curved surface along the shape of the photographer's face, at the time when the bottom is held to the photographer's eye.

21. The electronic camera as defined in claim 10, wherein at the time except the time of photographing, the electronic camera is suspended from the photographer's neck such that the display device and the objective lens face upward and downward, respectively.

* * * * *